(12) United States Patent
Hasan et al.

(10) Patent No.: US 12,541,541 B2
(45) Date of Patent: Feb. 3, 2026

(54) METHOD AND SYSTEM FOR GENERATING INTENT RESPONSES THROUGH VIRTUAL AGENTS

(71) Applicants: Asif Hasan, Marlborough, MA (US); Gaurav Johar, Toronto (CA); Kanishk Mehta, Toronto (CA); Sreevasthavan K C, Mumbai (IN); Akash Mourya, Mumbai (IN); Himanshu Kumar, Mumbai (IN); Surya S G, Mumbai (IN); Harshit Shah, Mumbai (IN); Ashwini Patil, Mumbai (IN); Saravanan Murugan, Mumbai (IN); Anuja Anil Kumar Singh, Mumbai (IN); Tridib Paul, Mumbai (IN)

(72) Inventors: Asif Hasan, Marlborough, MA (US); Gaurav Johar, Toronto (CA); Kanishk Mehta, Toronto (CA); Sreevasthavan K C, Mumbai (IN); Akash Mourya, Mumbai (IN); Himanshu Kumar, Mumbai (IN); Surya S G, Mumbai (IN); Harshit Shah, Mumbai (IN); Ashwini Patil, Mumbai (IN); Saravanan Murugan, Mumbai (IN); Anuja Anil Kumar Singh, Mumbai (IN); Tridib Paul, Mumbai (IN)

(73) Assignee: QUANTIPHI, INC., Marlborough, MA (US)

(*) Notice: Subject to any disclaimer, the term of this patent is extended or adjusted under 35 U.S.C. 154(b) by 27 days.

(21) Appl. No.: 18/218,057

(22) Filed: Jul. 4, 2023

(65) Prior Publication Data

US 2023/0350929 A1 Nov. 2, 2023

(51) Int. Cl.
*G06F 16/3329* (2025.01)

(52) U.S. Cl.
CPC .................. *G06F 16/3329* (2019.01)

(58) Field of Classification Search
None
See application file for complete search history.

(56) References Cited

U.S. PATENT DOCUMENTS

| 12,038,958 B1* | 7/2024 | Soubbotin ............ G06F 16/335 |
| 2009/0150387 A1* | 6/2009 | Marchewitz .......... G06F 16/951 |
| | | 707/999.005 |

(Continued)

FOREIGN PATENT DOCUMENTS

WO 2021034613 A1 2/2021

OTHER PUBLICATIONS

Na, "The GenAI Conversational Search Platform", available at <https://vectara.com/>2023, 6 pages.

*Primary Examiner* — Christopher J Raab
(74) *Attorney, Agent, or Firm* — D'Ambrosio & Menon, PLLC; Usha Menon

(57) ABSTRACT

A method and system for generating a response through a virtual agent is provided herein. The method comprises receiving information associated with a plurality of themes and topics. The method further comprises creating a knowledgebase based on the information received. The method further comprises analyzing the knowledgebase based on an intent identified, using an Artificial Intelligence (AI) model. Further, the method comprises generating a response corresponding to the intent through the virtual agent based on analyzation.

19 Claims, 9 Drawing Sheets

(56) References Cited

U.S. PATENT DOCUMENTS

| | | |
|---|---|---|
| 2012/0310770 A1 | 12/2012 | Cacheda Seijo et al. |
| 2018/0077088 A1* | 3/2018 | Cabrera-Cordon ............................ G06F 16/90335 |
| 2018/0322403 A1* | 11/2018 | Ron ...................... G06Q 10/107 |
| 2020/0005117 A1* | 1/2020 | Yuan ........................ G06F 40/35 |
| 2020/0044993 A1 | 2/2020 | Wu |
| 2020/0380077 A1* | 12/2020 | Ge ........................... G10L 15/18 |
| 2021/0073474 A1 | 3/2021 | Sengupta et al. |
| 2022/0051665 A1* | 2/2022 | Bade ........................ G06N 7/01 |
| 2022/0245358 A1* | 8/2022 | Williams ................ G06F 40/30 |
| 2024/0070434 A1* | 2/2024 | Garg .................... G06N 3/0455 |

* cited by examiner

METHOD AND SYSTEM FOR GENERATING INTENT RESPONSES THROUGH VIRTUAL AGENTS

TECHNICAL FIELD OF THE INVENTION

The present disclosure is related to method and system for generating intent responses through virtual agents. More specifically, the disclosure relates to a Large Language Model (LLM) based virtual agent that is capable of generating a response based on analyzing a knowledgebase and intent of user's query.

BACKGROUND OF THE INVENTION

A virtual agent refers to an interactive software program or system that simulates human-like conversations or interactions using artificial intelligence (AI) techniques. The virtual agent is designed to communicate with users in a natural language format, typically through text-based chat interfaces or voice-based interactions. The virtual agent is capable of understanding user queries or requests, interpreting the context, and providing appropriate responses or actions.

The virtual agent's functionality is based on advanced algorithms and AI models, which enables processing and analyzing user input, extracting relevant information, and generating meaningful and contextually appropriate responses. The virtual agent may utilize various techniques such as natural language processing (NLP), machine learning, pattern recognition, and knowledge representation to achieve accurate understanding and effective communication with users.

The virtual agent's capabilities may include but are not limited to:

Natural Language Understanding (NLU): The virtual agent is equipped with NLU algorithms to comprehend user intents, extract key information, and identify the context of the conversation.

Contextual Understanding: The virtual agent is capable of maintaining contextual awareness throughout the conversation, ensuring that responses are relevant and coherent within the ongoing dialogue.

Dialogue Management: The virtual agent utilizes sophisticated dialogue management techniques to maintain a coherent and engaging conversation flow, handling multiple turns and managing user expectations.

Knowledge Base Integration: The virtual agent can access and integrate with a knowledge base or database containing relevant information to provide accurate and up-to-date responses to user inquiries.

Personalization: The virtual agent may employ user profiling techniques to tailor responses based on individual preferences, past interactions, or demographic information.

Task Execution: The virtual agent may perform various tasks or actions on behalf of the user, such as retrieving information from external sources, making reservations, or initiating specific processes.

These virtual agents often rely on pre-defined responses or scripted dialogues, which may lack contextuality and fail to deliver human-like interactions. In current scenario, response generation by virtual agents typically involve techniques, such as creating document embeddings, querying relevant documents for contextual information, and applying BERT-based methods to generate or rephrase responses. However, these techniques often result in a loss of human-like responses.

There is, therefore, a need in the present state of art, for an automated method and system that leverages a Large Language Model (LLM) and a comprehensive knowledge bank to overcome the limitations of existing techniques and provide accurate, contextually relevant, and human-like responses through the virtual agent.

It is within this context that the present embodiments arise.

SUMMARY

The following embodiments present a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Some example embodiments disclosed herein provide a method for generating a response through a virtual agent, the method comprising receiving information associated with a plurality of themes and topics. The method may further include creating a knowledgebase based on the information received. The method may further include analyzing the knowledgebase based on an intent identified, using an Artificial Intelligence (AI) model. The method may also include generating a response corresponding to the intent through the virtual agent based on analyzation.

According to some example embodiments, the method further comprising receiving, by the virtual agent, a query from a user; determining, by the virtual agent, the intent associated with the query; and generating, by the virtual agent, the response based on the intent for the query.

According to some example embodiments, analyzing the knowledgebase comprises providing one or more optimal responses corresponding to the intent as recommendations to the virtual agent, and wherein the knowledgebase corresponds to a knowledge bank of documents.

According to some example embodiments, the plurality of themes and topics are modeled in a graph-based structure in the knowledgebase.

According to some example embodiments, the topics and themes are extracted from conversation history between at least one of two or more human agents, two or more users, or at least one human agent and at least one user.

According to some example embodiments, the AI model is a Large Language Model (ULM).

According to some example embodiments, the method further comprising preprocessing training datasets comprising textual data; and generating a plurality of tokens from the training datasets, wherein the plurality of tokens comprises words and sub-words.

According to some example embodiments, the method further comprising training the LLM based on the plurality of tokens to learn patterns, relationships, and representations of language, and the LLM generates the response based on the learned. patterns, relationships, and representations of language.

According to some example embodiments, the intent corresponds to at least one of a new intent or an existing intent, and the new intent is associated with a new query, and the existing intent is associated with a repeated query.

Some example embodiments disclosed herein provide a computer system for generating a response through a virtual agent, the computer system comprises one or more computer processors, one or more computer readable memories, one or more computer readable storage devices, and program instructions stored on the one or more computer readable storage devices for execution by the one or more computer processors via the one or more computer readable memories, the program instructions comprising receiving information associated with a plurality of themes and topics. The one or more processors are further configured for creating a knowledgebase based on the information received. The one or more processors are further configured for analyzing the knowledgebase based on an intent identified, using an Artificial Intelligence (AI) model. The one or more processors are further configured for generating a response corresponding to the intent through the virtual agent based on analyzation. ranking the utterances based on the score.

Some example embodiments disclosed herein provide a non-transitory computer readable medium having stored thereon computer executable instruction which when executed by one or more processors, cause the one or more processors to carry out operations for generating a response through a virtual agent. The operations comprising receiving information associated with a plurality of themes and topics. The operations further comprising creating a knowledgebase based on the information received. The operations further comprising analyzing the knowledgebase based on an intent identified, using an Artificial Intelligence (AI) model. The operations further comprising generating a response corresponding to the intent through the virtual agent based on analyzation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and still further example embodiments of the present disclosure will become apparent upon consideration of the following detailed description of embodiments thereof, especially when taken in conjunction with the accompanying drawings, and wherein.

Figure 1:
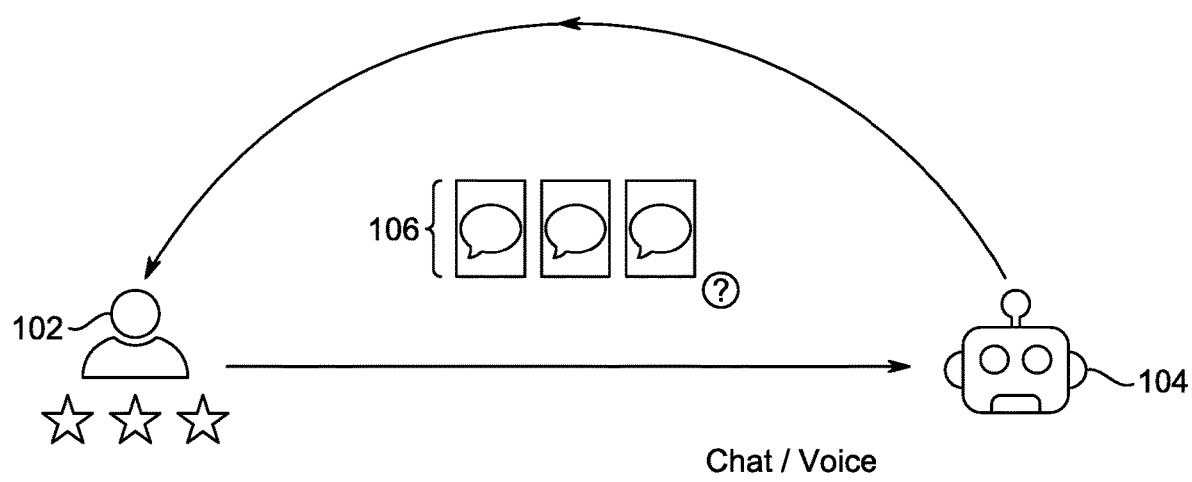
FIG. 1 illustrates a use case of a user interaction with a virtual agent, in accordance with an example embodiment.

The figures illustrate embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present invention.

Reference in this specification to "one embodiment" or "an embodiment" or "example embodiment" means that a particular feature, structure, or characteristic described in connection with the embodiment is included in at least one embodiment of the present invention. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

The terms "comprise", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

Definitions

The term "module" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The term "machine learning model" may be used to refer to a computational or statistical or mathematical model that is trained on classical ML modelling techniques with or without classical image processing. The "machine learning model" is trained over a set of data and using an algorithm that it may use to learn from the dataset.

The term "artificial intelligence" may be used to refer to a model built using simple or complex Neural Networks using deep learning techniques and computer vision algorithms. Artificial intelligence model learns from the data and applies that learning to achieve specific pre-defined objectives.

The term "virtual agent" may be used to refer to a virtual assistant that is computer program or AI system designed to simulate human-like conversations with users. They are typically powered by artificial intelligence and natural language processing technologies. The virtual agent can understand user inputs, generate appropriate responses, and perform specific tasks or provide information. They are often used in customer support, information retrieval, and other applications to provide automated and efficient conversational experiences.

End of Definitions

Embodiments of the present disclosure may provide a method, a system, and a computer program product for training a virtual agent. The method, the system, and the computer program product for training a virtual agent are described with reference to FIG. 1 to FIG. 9 as detailed below.

FIG. 1 illustrates a use case 100 of a user 102 interaction with a virtual agent 104, in accordance with an example embodiment. In an embodiment. The interaction begins when the user 102 provides input to the virtual agent 104 through a medium 106. The medium 106 for communication between the user 110 and the human agent 112 may be either in a form of voice or text. The user 102 may be, for example, a customer, client, or any other person seeking information or assistance through the virtual agent 104.

The user input may represent a query, request, or command from the user 102, indicating their intention or information they seek. The user input serves as the starting point for the virtual agent 104 to understand the user's needs and provide appropriate assistance or information. It ranges from specific questions or requests to more general inquiries or tasks. The objective of the virtual agent 104 is to accurately interpret and process the user input to deliver a relevant and helpful response.

Depending on the capabilities of the virtual agent 104, it may support multiple inputs and employ techniques such as speech recognition, natural language processing, and input validation to enhance the understanding of the user's input. The user input may act as an initial step for subsequent stages in the interaction, including intent identification, knowledge retrieval, response generation, and response delivery.

The virtual agent 104 may be capable of creating a smooth and seamless user experience by effectively capturing and interpreting the user's intent, regardless of the input format or language used. By understanding the user's intent accurately, the virtual agent 104 may provide more relevant and tailored responses, improving the overall user satisfaction and achieving the goals of the interaction.

The virtual agent 104 may employ various natural language processing (NLP) techniques to analyze and identify the intent of the user 102 accurately. Some commonly used approaches for intent identification are as follows:

Keyword Matching: This approach may involve comparing the user's input against a predefined set of keywords or phrases associated with specific intents. If a match is found, the system identifies the corresponding intent.

Rule-Based Systems: Rule-based systems may utilize predefined rules or patterns to identify intents based on the structure and content of the user's input. These rules can range from simple pattern matching to more complex logic-based rules. The rule-based systems are manually designed and require human expertise to define the rules accurately. For example, a rule may be defined to identify intents related to booking flights based on specific keywords or phrases in the user's input.

Machine Learning Techniques: The machine learning models, such as supervised or unsupervised algorithms, may be employed to train intent classification models. These models learn from labeled training data, where intents are explicitly annotated. Once trained, the model may classify new user queries into different intents based on learned patterns and features. This approach allows for more flexibility and adaptability in identifying intents. Additionally, the proposed system utilizes a unique aspect where context-based content is retrieved specifically for unsupervised information or queries. This context-based content, obtained from the knowledge bank or external sources, provides additional context and information relevant to the unsupervised queries. The retrieved context is then consumed by the Large Language Model (LLM) to generate responses of improved quality. By combining the machine learning techniques with context-based content retrieval, the proposed system achieves improved response generation, ensuring better adaptability, and flexibility in identifying intents and delivering accurate and contextually appropriate responses.

Natural Language Understanding (NLU): The NLU techniques may utilize advanced algorithms and models to analyze the user's input and extract relevant information, including the intent. The NLU may employ techniques like part-of-speech tagging, named entity recognition, dependency parsing, and semantic role labeling to understand the syntactic and semantic structure of the user's query. This approach enables a deeper understanding of the user's intent by considering the context and relationships within the input. These techniques may expand the capability of the system by utilizing the LLM for better understanding. By incorporating the LLM into the NLU process, the system benefits from the LLM's unique capabilities to capture intricate language patterns, relationships, and representations. This integration of the LLM enhances the analysis of user queries, leading to more comprehensive intent extraction.

It is to be noted that the selection of intent identification approach depends on factors such as the complexity of the application, available training data, and desired accuracy. In some embodiments, a combination of these techniques may be used to improve accuracy and handle a wider range of user inputs.

By accurately identifying the user's intent, the virtual agent 104 may analyze a knowledge bank to generate appropriate responses using the NLP model. This is further explained in greater detail in conjunction with FIGS. 2-9.

Figure 2:
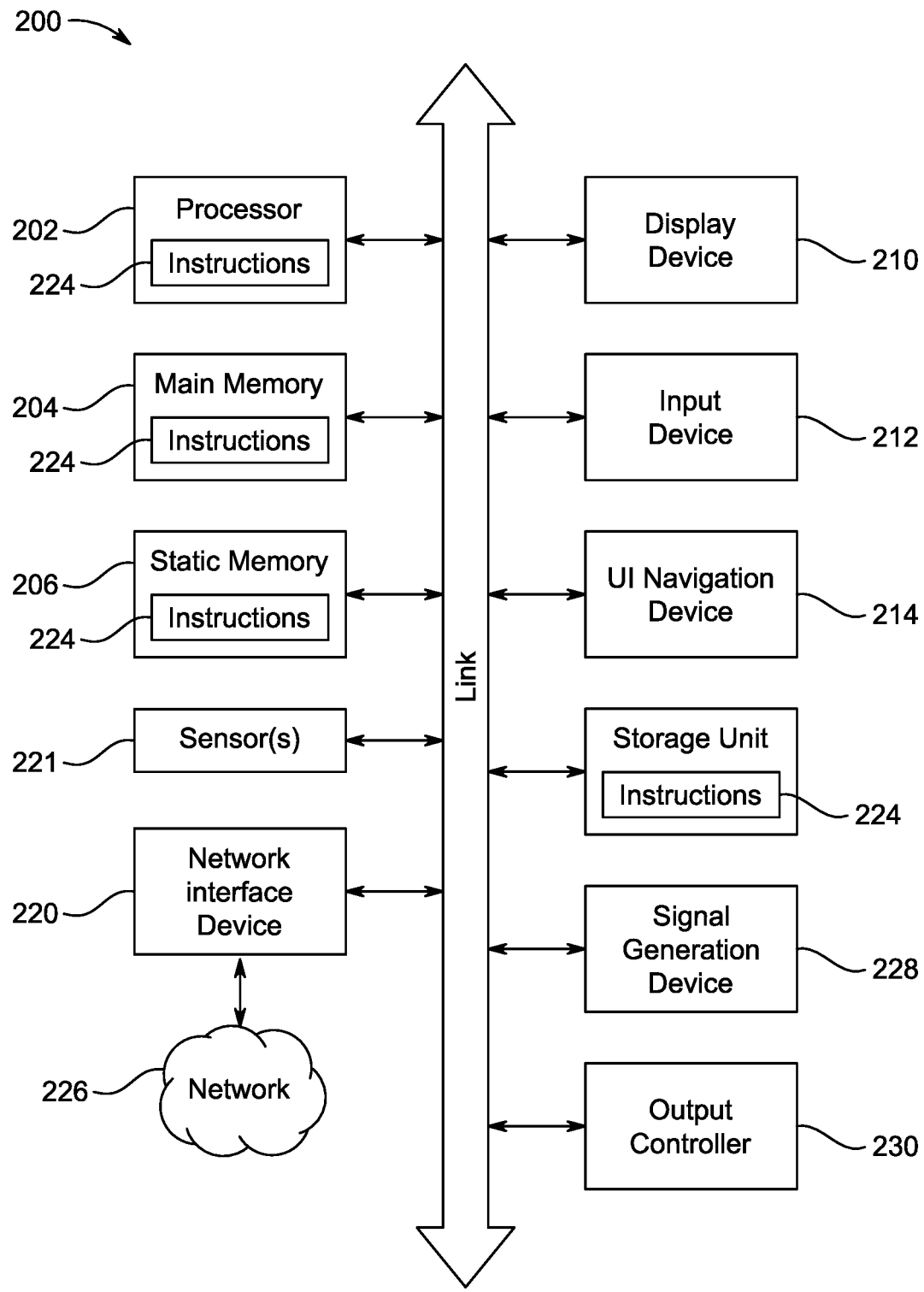
FIG. 2 illustrates a block diagram of an electronic circuitry for generating a response through a virtual agent, in accordance with an example embodiment.

FIG. 2 illustrates a block diagram of an electronic circuitry for generating a response through a virtual agent. The machine of FIG. 2 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 2 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 200 includes at least one processor 202 (e.g., a central processing unit (CPU), a graphics processing unit (GPU), advanced processing unit (APU), or combinations thereof), one or more memories such as a main memory 204, a static memory 206, or other types of memory, which communicate with each other via link 208. Link 208 may be a bus or other type of connection channel. The machine 200 may include further optional aspects such as a graphics display unit 210 comprising any type of display. The machine 200 may also include other optional aspects such as an alphanumeric input device 212 (e.g., a keyboard, touch screen, and so forth), a user interface (UI) navigation device 214 (e.g., a mouse, trackball, touch device, and so forth), a storage unit 216 (e.g., disk drive or other storage device(s)), a signal generation device 218 (e.g., a speaker), sensor(s) 221 (e.g., global positioning sensor, accelerometer(s), microphone(s), camera(s), and so forth), output controller 228 (e.g., wired or wireless connection to connect and/or communicate with one or more other devices such as a universal serial bus (USB), near field communication (NFC), infrared (IR), serial/parallel bus, etc.), and a network interface device 220 (e.g., wired and/or wireless) to connect to and/or communicate over one or more networks 226.

Executable Instructions and Machine-Storage Medium

The various memories (i.e., 204, 206, and/or memory of the processor(s) 202) and/or storage unit 216 may store one or more sets of instructions and data structures (e.g., software) 224 embodying or utilized by any one or more of the methodologies or functions described herein. These instructions, when executed by processor(s) 202 cause various operations to implement the disclosed embodiments.

Example Machine Architecture and Machine-Readable Medium

FIG. 2 illustrates a representative machine architecture suitable for implementing the systems and so forth or for executing the methods disclosed herein. The machine of FIG. 2 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 2 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

As used herein, the term "network" may refer to a long-term cellular network (such as GSM (Global System for Mobile Communication) network, LTE (Long-Term Evolution) network or a CDMA (Code Division Multiple Access) network) or a short-term network (such as Bluetooth network, Wi-Fi network, NFC (near-field communication) network, LoRaWAN, ZIGBEE or Wired networks (like LAN, el all) etc.).

As used herein, the term "computing device" may refer to a mobile phone, a personal digital assistance (PDA), a tablet, a laptop, a computer, VR Headset, Smart Glasses, projector, or any such capable device.

As used herein, the term 'electronic circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 3:
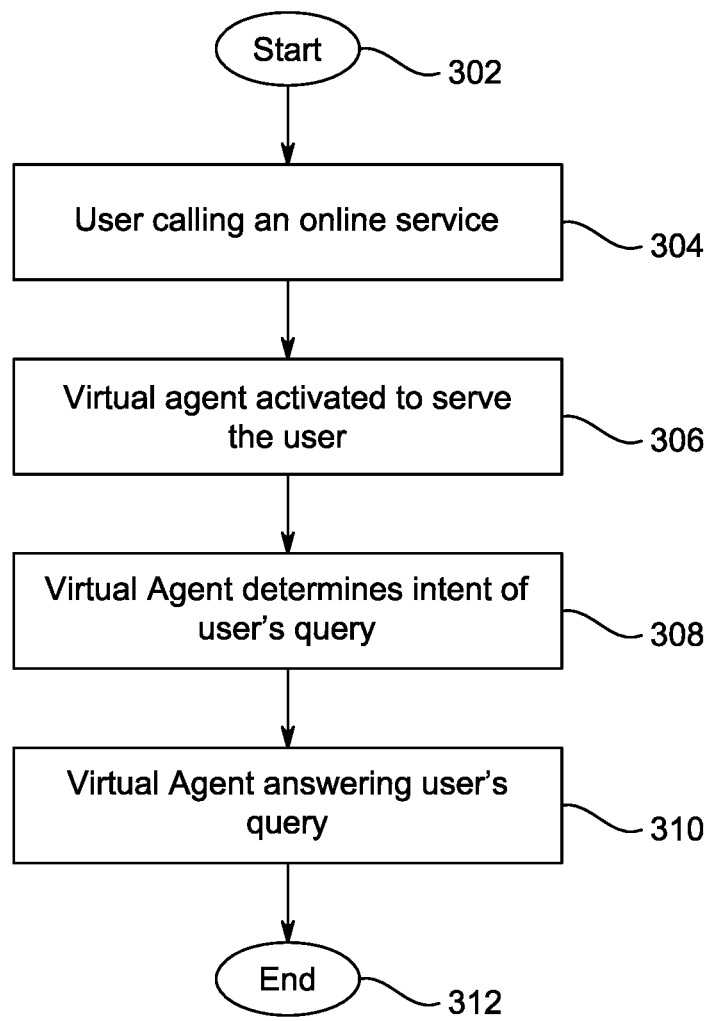
FIG. 3 shows a flow diagram of a user interaction with a virtual agent, in accordance with an example embodiment.

FIG. 3 shows a flow diagram of a user 102 interaction with a virtual agent 104. It will be understood that each block of the flow diagram of the method 300 may be implemented by various means, such as hardware, firmware, processor, circuitry, and/or other communication devices associated with execution of software including one or more computer program instructions 224. For example, one or more of the procedures described above may be embodied by computer program instructions 224. In this regard, the computer program instructions which embody the procedures described above may be stored by a memory 204 of the system 200, employing an embodiment of the present invention and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 300 illustrated by the flowchart diagram of FIG. 3 shows the user interaction with the virtual agent. Fewer, more, or different steps may be provided.

The method 300 starts at step 302, and at the step 304 a user calls an online service. The user may initiate a call to the online service through various means such as, but not limited to, accessing a website, using a mobile application, or interacting with a chatbot.

In an embodiment, a virtual agent activated to serve the user at 306. In particular, the user who calls for the online service may seek assistance or information from the virtual agent. The virtual agent is an automated system that may be designed to interact with users and provide relevant information or assistance. The information may be related to travel, such as booking flights, finding accommodation, or getting recommendations for popular destinations and the like.

Furthermore, at step 308 the virtual agent determines an intent of the user's query. In this step, the virtual agent analyzes the user's query or request to determine their intent. The intent refers to the specific purpose or objective behind the user's interaction. The virtual agent employs various techniques such as natural language processing and machine learning algorithms to understand the user's intent accurately. By way of an example, consider a scenario where the user asks, "What are the best hiking trails near me?". The virtual agent analyzes the query and determines that the user's intent is to find information about hiking trails in their vicinity.

Based on determination, the virtual agent answers the user's query at step 310 and the method 300 terminates at 312. In the process of answering the user's query, the virtual agent leverages its knowledge base, which may include a collection of documents or other sources of information, to provide a relevant and informative response. In continuation to the above example, in response to the user's query about hiking trails, the virtual agent may generate a list of the top-rated hiking trails in the user's location. It may provide details such as trail names, difficulty levels, and scenic highlights.

Figure 4:
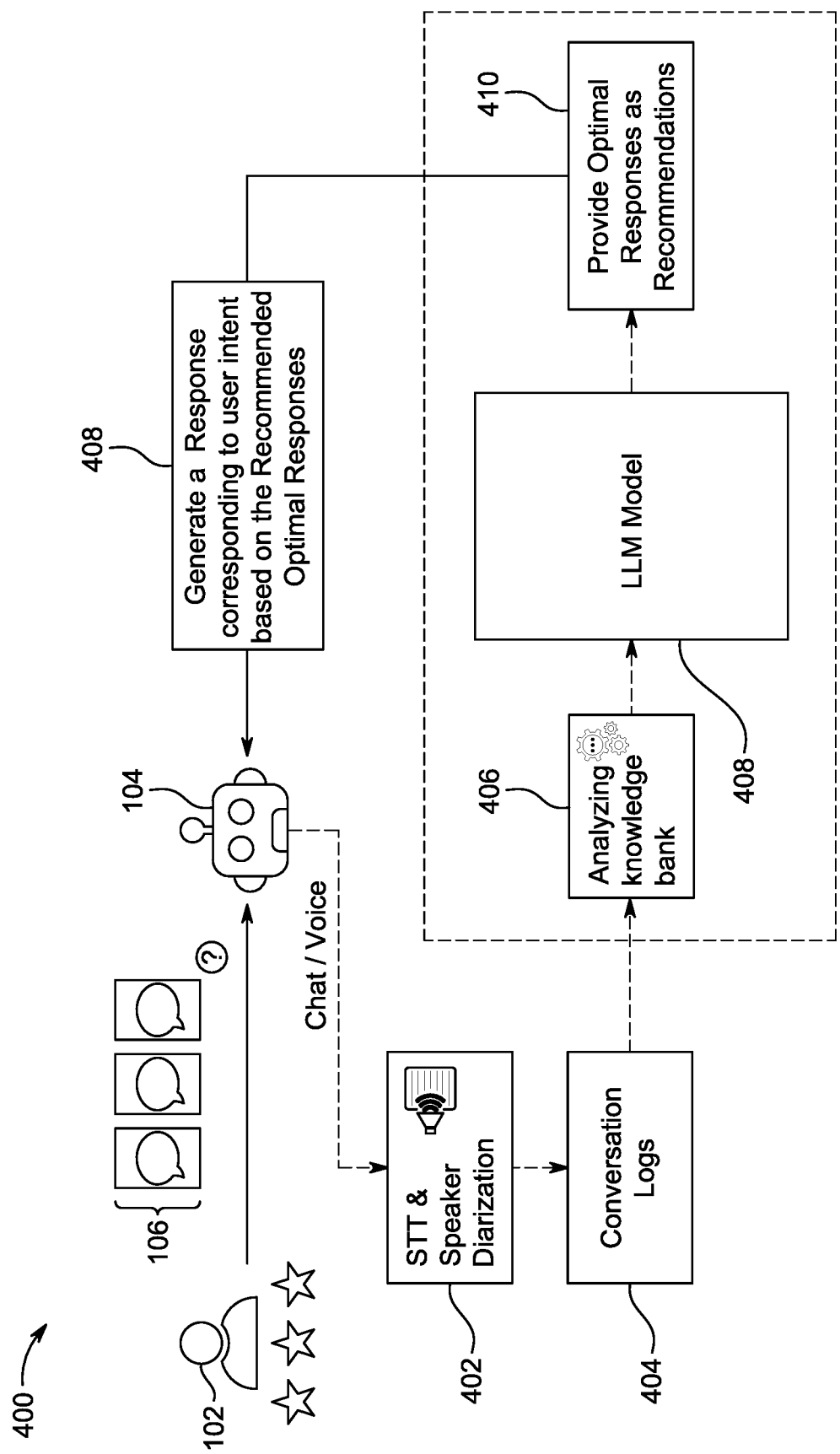
FIG. 4 illustrates a block diagram for generating a response through a virtual agent, in accordance with an example embodiment.

FIG. 4 illustrates a block diagram for generating a response through a virtual agent, consistent with embodiments of the present disclosure. The user 102 interacts with a virtual agent 104 through a medium 106. In an embodiment the medium 106 may be text or voice. Furthermore, all the interactions are diarized and if required, a speech to text module 402 is used.

User messages contain the messages or queries sent by the user to the virtual agent. This can include text inputs, voice commands, or any other form of user communication.

Agent responses include the replies or responses generated by the virtual agent in reaction to the user's messages. These responses can be in the form of text, voice, or other relevant formats depending on the medium of interaction.

In an example embodiment, diarization of speaker refers to the process of identifying and distinguishing between different speakers in an audio conversation or interaction. Diarization involves segmenting the audio signal into distinct speaker turns or segments, labeling them according to the speaker's identity, and determining when a new speaker begins talking or when a speaker switch occurs.

Virtual agents or chatbots rely on natural language processing (NLP) to understand and respond to user inputs. However, in scenarios where multiple participants are involved, such as in group discussions or meetings, speaker diarization becomes essential to accurately attribute spoken content to specific individuals.

By performing speaker diarization, the virtual agent 104 may analyze the audio input, recognize different speakers, and associate their spoken content with respective identities. This enables the virtual agent 104 to provide more personalized and context-aware responses, tailor the interaction based on individual preferences or histories, and facilitate smoother multi-party conversations.

Speaker diarization algorithms typically utilize techniques such as voice activity detection (VAD) to determine when a speaker is active, speech segmentation to identify speaker boundaries, and speaker recognition or clustering algorithms to assign speakers to their respective segments. These algorithms can be trained on large amounts of audio data to improve their accuracy in distinguishing between different speakers and handling various acoustic environments.

Apart from the VAD, speaker change detection algorithms can also be employed to identify transitions between different speakers. These algorithms analyze acoustic features, such as pitch, energy, or spectral characteristics, to detect changes in the speaking style or characteristics, indicating a potential speaker change.

Further, advanced acoustic modeling techniques, such as Gaussian Mixture Models (GMMs) or Hidden Markov Models (HMMs), may be used to capture speaker-specific information and model the acoustic properties of individual speakers. These models may be trained on large datasets to learn speaker-specific patterns and improve the accuracy of diarization.

Alternatively, deep neural networks (DNNs) and deep learning architectures, such as recurrent neural networks (RNNs) or convolutional neural networks (CNNs), can also be applied to speaker diarization tasks. These models can learn complex patterns and representations of speaker characteristics, leading to improved accuracy in identifying speaker boundaries and assigning speakers to segments.

In addition to audio information, incorporating other modalities like video or textual data can enhance the diarization process. Visual cues from video, such as lip movements or facial expressions, can provide additional information for speaker identification. Textual data from transcriptions or subtitles can also be used to align speech segments with corresponding text and helps in diarization.

In an example embodiment, a knowledge bank (also referred as a knowledgebase) is created at block 404 by aggregating a diverse collection of documents. These documents cover a wide range of themes and topics, obtained from various sources such as news articles, research papers, books, and other relevant textual resources. The objective of the knowledge bank is to provide a vast array of information that can be queried to retrieve contextual details for generating responses. By accessing the knowledge bank, the virtual agent may provide users with appropriate answers to their queries, or guidance related to the identified intent.

In some exemplary embodiments, an (Application Programming Interface) API integration may be implemented to incorporate external services or databases into the knowledge bank. By employing the API, the virtual agent may retrieve real-time information from sources such as web APIs, databases, or other online resources. This integration expands the scope of the knowledge bank, enabling access to the latest information and ensuring up-to-date responses.

In order to generate accurate and contextually appropriate response, the knowledge bank may be analyzed, at block 406. In particular, a Large Language Model (LLM) is utilized to analyze a collection of documents in the knowledge bank. The purpose of this analysis is to identify and understand newly identified intents expressed by users. The LLM analyze the contents of the documents and extracts relevant information, patterns, and relationships within the text.

In some exemplary embodiments, the LLM, during its analysis, may utilize this integrated API to retrieve relevant information from external sources in addition to the existing collection of documents. The API may be employed to fetch real-time data, supplementary articles, or domain-specific knowledge, allowing the LLM to acquire a more comprehensive understanding of the newly identified intents. By combining information from the knowledge bank and external sources via the API, the LLM can generate more accurate and contextually appropriate responses.

By incorporating the API into the present system enhances the capability to access real-time information and enrich the analysis of the knowledge bank, thereby improving the accuracy and relevance of the generated response.

Therefore, for analyzing the knowledge bank of documents, the LLM is required to be trained on the knowledge bank to develop a deep understanding of language patterns, relationships, and representations, at block 408. The training process involves preprocessing training datasets comprising textual data, generating tokens (words and sub-words) from the training datasets, and training the LLM based on these tokens. Through this process, the LLM may learn the patterns, relationships, and representations of language, enabling it to generate responses that align with the identified intents within the context of the knowledge bank.

In a more elaborative way, common approach for training the LLM may include the following steps:

Preprocessing the Training Datasets: The first step in the training process is to preprocess the training datasets, which includes textual data. The preprocessing includes various tasks such as cleaning the data, removing unnecessary characters or symbols, handling punctuation, converting text to lowercase, and tokenizing the text into individual units. This ensures that the textual data is in a suitable format for further processing.

Generating Tokens: Once the training datasets are pre-processed, the next step is to generate tokens from the textual data. Tokens are the fundamental units of text used by the LLM for analysis and understanding. In this step, the textual data is divided into smaller units, that may include words and sub-words.

Learning Patterns, Relationships, and Representations: Once the training datasets are tokenized, the language model may proceed to the training phase. The LLM, based on the generated tokens, learns the patterns, relationships, and representations of language within the context of the knowledge bank.

It should be noted that during training, the LLM may utilize some advanced machine learning algorithms, such as neural networks, to learn from the tokenized data. These algorithms may allow the model to capture the statistical patterns and dependencies present in the language. By analyzing the relationships between tokens and their context, the language model may build a deep understanding of the semantic and syntactic structure of the text.

After the LLM is trained, it analyzes the knowledge bank of documents to leverages its understanding of language and context to provide recommendations for optimal responses that are in line with the identified intents, at block 410. These recommended optimal responses may then be used by the virtual agent to generate an accurate and relevant response for the user's query, at block 412.

Figure 5:
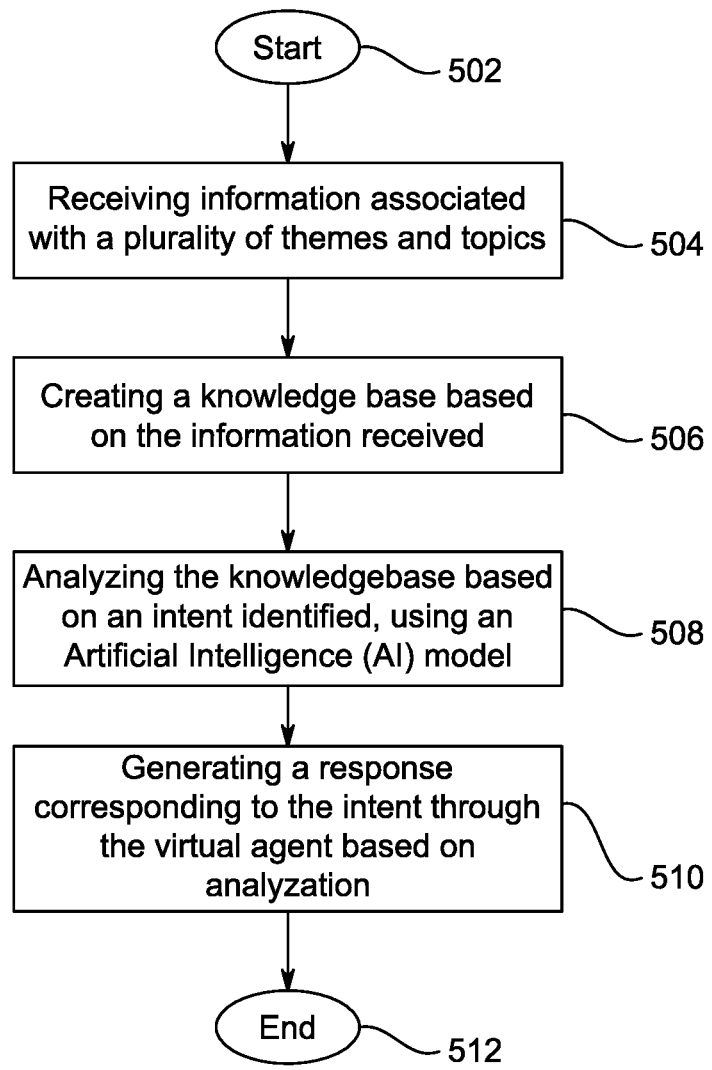
FIG. 5 shows a flow diagram of a method for generating a response through a virtual agent, in accordance with an example embodiment.

FIG. 5 illustrates a method 500 for generating a response through a virtual agent, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 500 illustrated by the flow diagram of FIG. 500 for generating a response through a virtual agent start at 502. The method 500 may include, at step 504, receiving information associated with a plurality of themes and topics. The information may correspond to a collection of different documents that are retrieved from different resources. These documents may include articles, papers, reports, manuals, and other textual resources.

In some embodiments, the topics and themes may be extracted from conversation history between at least one of two or more human agents, two or more users, or at least one human agent and at least one user. These extracted topics and themes may then be used to better understand user intents and provide more relevant and personalized responses to the user.

Some general techniques for extracting themes and topics are as follows:

Natural Language Processing (NLP) Techniques: NLP techniques are commonly used to process and analyze text data, including conversation history. These techniques may help to identify topics and themes based on the patterns, keywords, and semantic relationships within the conversations.

Text Clustering: Clustering algorithms may be applied to conversation history to group similar conversations together based on their content. These clusters may represent different topics or themes discussed in the conversations which may be extracted.

Topic Modeling: Topic modeling algorithms may be employed to automatically identify underlying topics within the conversation history. These algorithms analyze the distribution of words and phrases across the conversations to determine latent topics that explain the observed patterns.

Keyword Extraction: Keyword extraction techniques may be used to identify important keywords or phrases that are indicative of the main topics or themes in the conversation history. These keywords may be extracted based on their frequency, relevance, or other linguistic features.

Named Entity Recognition (NER): NER techniques may be utilized to identify, and extract named entities from the conversation history. The named entities may include names of people, organizations, locations, or specific entities relevant to the conversation.

The method 500, at step 506, may include creating a knowledgebase based on the information received. The knowledgebase consists of a diverse range of documents that cover various themes, and topics from different domains. In some embodiments, the themes and topics may be extracted directly from these documents present in the knowledgebase. The commonly used extraction techniques are already discussed above.

In a more elaborative way, the knowledgebase is created by leveraging the collection of documents that cover a multitude of information regarding different themes and topics. For creating the knowledgebase of documents, the below techniques may be followed:

Document Acquisition: The first step may be to acquire a collection of various documents that contain relevant information. These documents may be obtained from various sources such as research papers, articles, books, manuals, websites, or any other textual resources that cover a wide range of topics.

Document Preprocessing: The acquired documents may undergo preprocessing to ensure that they are in a suitable format for analysis. This may involve tasks like removing irrelevant sections, formatting the text, handling special characters, and standardizing the document structure.

Knowledge Representation: Each document in the collection may then represented in a format that allows for efficient storage and retrieval. This representation may vary depending on the specific requirements and design of the knowledgebase. It may involve techniques like document indexing, database structures, or other forms of data organization.

Indexing and Categorization: To facilitate quick and accurate retrieval of information, the documents in the knowledgebase may be indexed and categorized based on their content. This may involve assigning keywords, tags, or metadata to each document to represent its main themes or topics. It allows for efficient querying and retrieval of relevant documents based on user intents.

Continuous Updates: The knowledgebase is a dynamic entity that requires regular updates to stay current and relevant. As new documents become available or existing ones are updated, they are incorporated into the knowledgebase through an update mechanism. This ensures that the knowledgebase remains up-to-date and comprehensive.

By following these steps, the knowledgebase may be created as a repository of documents that cover a wide range of themes and topics. The knowledgebase may act as a valuable resource for the custom deployed LLM to analyze and retrieve relevant information when responding to the user's query.

Once the knowledgebase is created, the method 500, at step 508, may include analyzing the knowledgebase based on an intent identified, using an Artificial Intelligence (AI) model. In an embodiment, the AI model may be the LLM (language model). A process of analyzing the knowledgebase is further explained in conjunction with FIG. 6. Some of the common techniques for analyzing the knowledgebase are as follows:

Topic Modeling: Topic modeling algorithms may be employed to extract themes and topics from the knowledgebase. These algorithms, such as Latent Dirichlet Allocation (LDA) or Non-negative Matrix Factorization (NMF), identify latent topics within the document collection. By analyzing the distribution of words and their co-occurrence patterns, topic modeling may provide understanding of the underlying themes and topics present in the knowledgebase.

Natural Language Processing (NLP) Techniques: Various NLP techniques may be utilized to analyze the knowledgebase. For example, Named Entity Recognition (NER) may identify and extract entities such as names, locations, organizations, and other relevant information. Sentiment analysis may determine the sentiment or emotion associated with specific documents or segments of text. Text classification techniques may be applied to categorize the documents based on predefined labels or classes. These NLP techniques also involve the processing of unstructured pieces of data or information using the LLM for generating responses. By incorporating the LLM into the NLP process, the system can leverage its language understanding capabilities to extract meaning from unstructured data. The LLM's ability to learn patterns, relationships, and representations of language enhances the analysis of the knowledge base, resulting in more accurate and contextually relevant responses.

Graph-based Analysis: The knowledgebase may be represented as a graph, where documents are nodes, and relationships between them (e.g., similarity, co-occurrence) are edges. Graph-based analysis techniques, such as graph clustering or graph centrality algorithms, may be employed to identify groups of related documents, influential documents, or key connections between different themes or topics.

Deep Learning Approaches: Deep learning models, such as recurrent neural networks (RNNs), convolutional neural networks (CNNs), or transformer models, may be utilized for knowledgebase analysis. Transformer models, such as LLM, have shown significant advancements in language understanding and representation learning. By incorporating transformer models, including LLM, into the knowledge base analysis, the system can benefit from their ability to capture intricate language patterns and relationships. These models can learn complex patterns and relationships within the documents, allowing for more nuanced understanding and identification of intent-related information.

Knowledge Graphs: Knowledge graphs provide a structured representation of knowledge, where entities and their relationships are modeled. By building a knowledge graph from the documents in the knowledgebase, it becomes possible to perform advanced reasoning, inference, and query operations. This enables more sophisticated analysis of intent-related information and facilitates accurate recommendations.

Further, the method 500, at step 510, may include generating a response corresponding to the intent through the virtual agent based on analyzation and the method 500 terminates at 512. A process of generating the response based on analyzing the knowledgebase is explained in greater detail in conjunction with FIG. 6. Here are some common techniques for generating the response:

Rule-based Systems: Rule-based systems may be utilized to generate responses based on predefined rules and patterns. These systems may have a set of predefined templates or patterns that match specific intents, allowing the virtual agent to select and populate the appropriate response based on the analyzed intent and relevant information from the knowledgebase.

Natural Language Generation (NLG): NLG techniques may be employed to automatically generate human-like responses. NLG models may learn patterns and structures from the analyzed knowledgebase and use that knowledge to generate coherent and contextually relevant responses. These models may be trained on large amounts of text data to improve the quality and fluency of the generated responses.

Neural Machine Translation (NMT): NMT models may be employed to generate responses by treating the intent identification as a translation task. The virtual agent may translate the user's query or intent into a response using the learned language patterns and representations. This approach allows the virtual agent to generate responses that are grammatically correct and aligned with the user's intent.

Reinforcement Learning: Reinforcement learning techniques may be applied to optimize the response generation process. By formulating response generation as a sequential decision-making problem, reinforcement learning algorithms may be employed to learn the optimal policy for generating responses based on the analyzed intent and knowledgebase. This approach enables the virtual agent to improve its response generation capabilities over time.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g., the processor 202) configured to perform some or each of the operations of the method 500. The processor may, for example, be configured to perform the operations 502-512 by performing hardware implemented logical functions, executing stored instructions, or executing algorithms for performing each of the operations. Alternatively, the apparatus may comprise means for performing each of the operations described above. In this regard, according to an example embodiment, examples of means for performing operations (502-512) may comprise, for example, the processor 202 which may be implemented in the system 200 and/or a device or circuit for executing instructions or executing an algorithm for processing information as described above.

Figure 6:
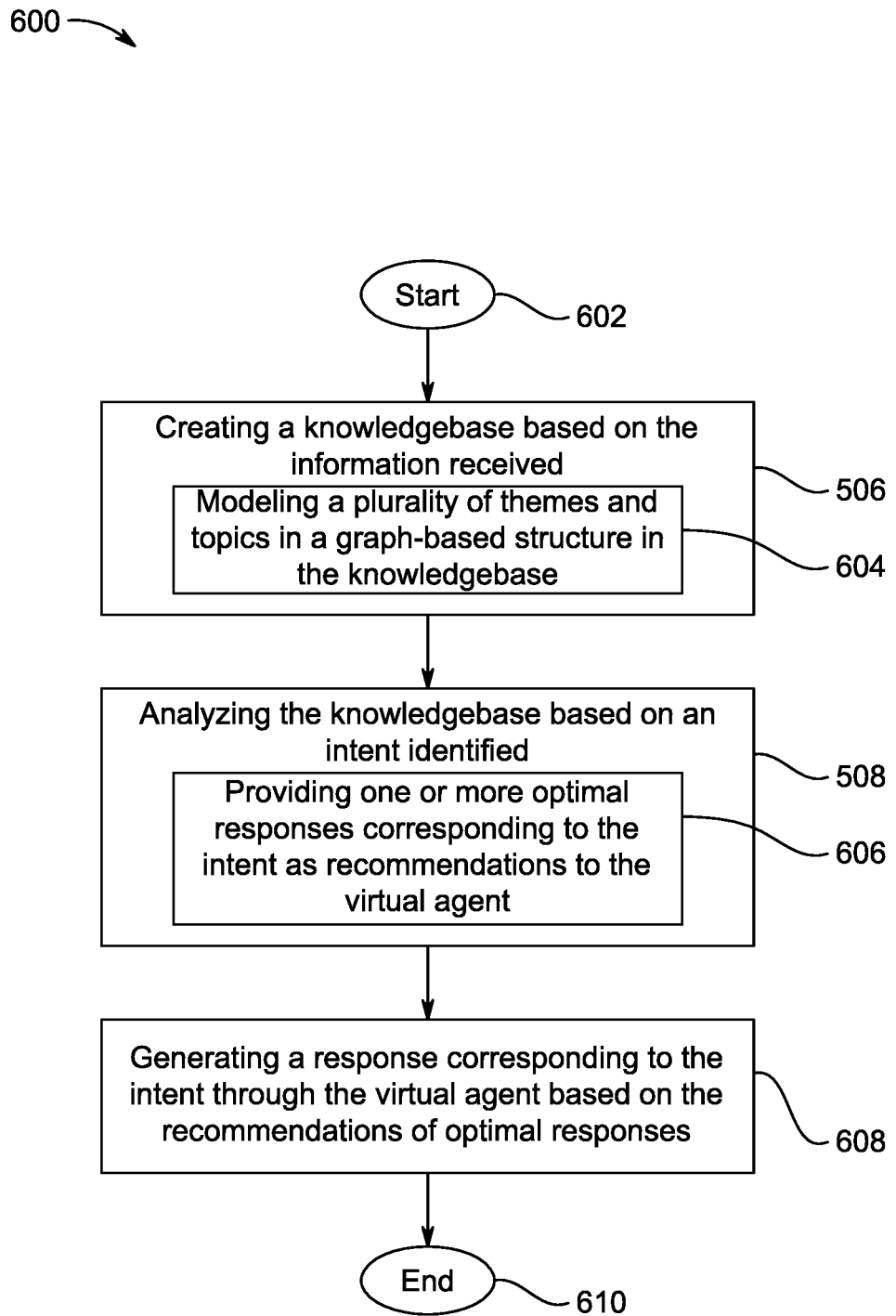
FIG. 6 illustrates a block diagram for generating a response based on analyzing a knowledgebase, in accordance with an example embodiment.

FIG. 6 shows a flow diagram of a method 600 for generating a response based on analyzing knowledgebase, in accordance with an example embodiment. It will be understood that each block of the flow diagram of the method 600 may be implemented by various means, such as hardware, firmware, processor, circuitry, and/or other communication devices associated with execution of software including one or more computer program instructions 224. For example, one or more of the procedures described above may be embodied by computer program instructions 224. In this regard, the computer program instructions which embody the procedures described above may be stored by a memory 204 of the system 200, employing an embodiment of the present invention and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 shows a method for generating the response based on analyzing knowledgebase. Fewer, more, or different steps may be provided.

The method 600 starting at 602 commences by creating a knowledgebase based on the information received as mentioned in step 506 of method 500. In an embodiment, the method 600, at step 604 may further include modeling a plurality of themes and topics in a graph-based structure in the created knowledgebase.

To model the plurality of themes and topics in the graph-based structure within the knowledgebase, some common approach may be adopted:

Theme and Topic Identification: This approach is to identify and extract themes and topics from the information received. This may be achieved through various techniques such as text analysis, natural language processing (NLP), or topic modeling algorithms. These techniques help identify key concepts, recurring patterns, and significant terms within the information.

Graph Representation: Once the themes and topics are identified, a graph-based structure is created to represent their relationships within the knowledgebase. In this structure, themes and topics are represented as nodes, and their relationships are represented as edges connecting the nodes.

Node Creation: Each identified theme and topic is represented as a node in the graph. Nodes may include additional metadata or properties associated with the respective theme or topic, such as keywords, descriptions, or relevance scores. This information helps in organizing and categorizing the themes and topics within the graph.

Edge Creation: The relationships between themes and topics are captured through edges in the graph. These edges define the connections and associations between different themes and topics. It should be noted that the nature of relationships may vary, such as hierarchical relationships, co-occurrence relationships, or semantic relationships based on similarity or relatedness measures.

Graph Structure: The graph structure may take various forms depending on the specific requirements and design choices. It may be a directed graph, where edges have specific directions indicating the flow or hierarchy of information. It may also be an undirected graph, where edges represent general associations without any specific direction. The structure of the graph allows for flexible representation and exploration of the relationships between themes and topics.

By modeling themes and topics in the graph-based structure, the knowledgebase obtains a visual representation of the interconnectedness and relationships between different concepts. This structure enables efficient navigation, querying, and retrieval of relevant information based on the identified themes and topics.

As previously mentioned at step 508 of the method 500, once the knowledgebase is created, it is further analyzed based on an intent identified using the LLM. To analyze the knowledgebase, the method 600, at step 606 may further include providing one or more optimal responses corresponding to the intent as recommendations to the virtual agent.

In a more elaborative way, the knowledgebase analysis may include leveraging the understanding of language and context stored within the LLM to provide optimal responses as recommendations to the virtual agent. Here is an explanation of how the analysis may be performed:

Intent Identification: Before analyzing the knowledgebase, the intent of the user's query or input needs to be identified. Intent identification may be achieved through various techniques, such as natural language processing (NLP) algorithms, machine learning models, or rule-based approaches. The intent represents the purpose or goal behind the user's request or query.

Contextual Analysis: Once the intent is identified, the LLM applies its language comprehension capabilities to analyze the knowledgebase in the context of the identified intent. The LLM consider the specific intent and context provided by the user's query to understand the relevant information needed to generate the response.

Retrieval of Optimal Responses: Based on the analysis of the knowledgebase, the LLM retrieves one or more optimal responses that correspond to the identified intent. These responses are generated by leveraging the patterns, relationships, and representations of language learned during the training process of the LLM.

Response Recommendation: The optimal responses are then provided as recommendations to the virtual agent. These responses are designed to align with the identified intent and aim to provide relevant, accurate, and contextually appropriate information to the user.

The method 600, at step 608 may further include generating a response corresponding to the intent through the virtual agent based on the recommendations of optimal responses and the method 600 terminates at 610.

The LLM may finally generate a response from the recommended responses entirely on its own or provide suggestions to the virtual agent, which may then present the response to the user. The response generation process considers factors such as the user's intent, the content of the knowledgebase, and any additional contextual information available.

In some example embodiments, a computer programmable product may be provided. The computer programmable product may comprise at least one non-transitory computer-readable storage medium having stored thereon computer-executable program code instructions that when executed by a computer, cause the computer to execute the method 600.

In an example embodiment, an apparatus for performing the method 600 of FIG. 6 above may comprise a processor (e.g., the processor 202) configured to perform some or each of the operations of the method 600. The processor may, for example, be configured to perform the operations (602-610) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (602-610) may comprise, for example, the processor 202 which may be implemented in the system 200 and/or a device or circuit for executing instructions or executing an algorithm for processing information as described above.

Figure 7:
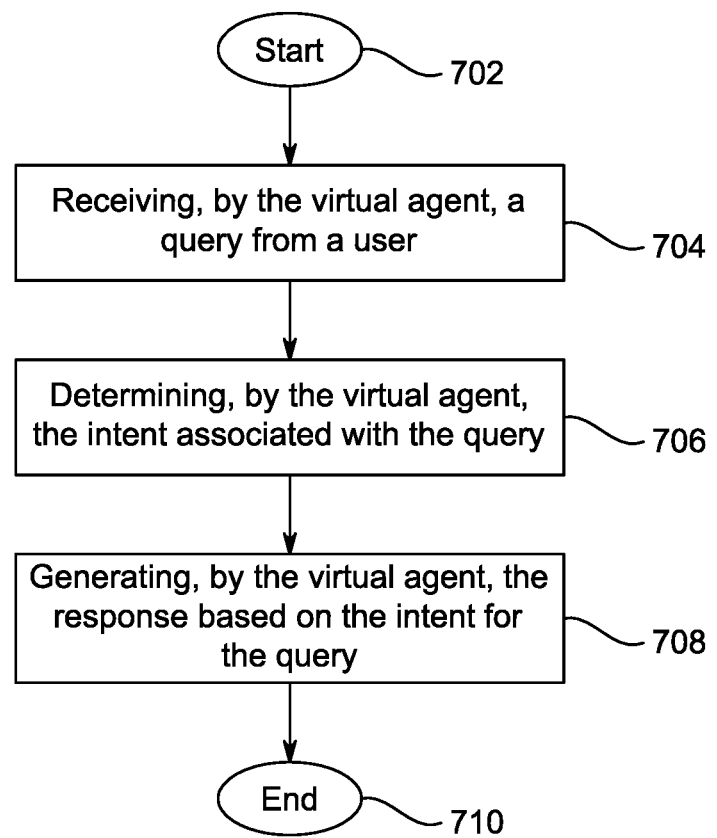
FIG. 7 shows a flow diagram of a method for generating a response through a virtual agent based on identified intent, in accordance with an example embodiment.

FIG. 7 illustrates a method 700 for generating a response through a virtual agent based on identified intent, in accordance with an example embodiment. It will be understood that each block of the flow diagram of the method 700 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 700 illustrated by the flow diagram of FIG. 7 for generating a response through a virtual agent starts at step 702. The method 700 may include, at step 704, receiving, by the virtual agent, a query from a user.

The method 700, at step 706, may include determining, by the virtual agent, the intent associated with the query. In this step, the virtual agent analyzes the user's query to determine the intent behind it. The intent represents the purpose or goal of the user's query. This may be achieved by the following techniques:

Intent Classification: The virtual agent may utilize machine learning techniques, such as supervised learning algorithms, to classify the user's query into predefined intent categories. A training dataset consisting of labeled queries and their corresponding intents is used to train a classifier. The virtual agent then applies this trained model to predict the intent of the user's query.

Natural Language Understanding (NLU): NLU techniques may be employed to extract the intent from the user's query. NLU models may analyze the syntactic and semantic structure of the query, identify key phrases or keywords, and map them to predefined intents. Techniques like named entity recognition, part-of-speech tagging, and dependency parsing can be applied to assist in intent determination.

Keyword Matching: The virtual agent may use a rule-based approach to match the user's query against a set of predefined keywords or patterns associated with specific intents. If the query contains keywords or phrases that match these predefined patterns, the intent may be determined accordingly.

Deep Learning Approaches: Deep learning models, such as recurrent neural networks (RNNs) or transformer-based models, may be utilized for intent detection. These models may learn complex patterns and representations from large amounts of labeled query-intent pairs, enabling them to accurately identify the intent of a given query.

The method 700 may include, at step 708, generating, by the virtual agent, the response based on the intent for the query and the method 700 terminates at step 710. Once the intent associated with the user's query is determined, the virtual agent generates a response that aligns with that intent. The response generation may be of the following types:

Template-based Responses: The virtual agent may employ a set of predefined response templates associated with each intent. These templates contain placeholders for dynamic information extracted from the query or knowledgebase. By populating the placeholders with relevant information, the virtual agent generates a response specific to the identified intent.

Dialogue Generation: The virtual agent may engage in a dialogue with the user by generating responses that maintain a conversational flow. This may involve using context-aware techniques, such as tracking previous interactions or maintaining a dialogue state, to generate responses that are coherent and relevant to the identified intent.

Machine Translation Response: If the user's query is in a different language than the virtual agent's response, than in that case the machine translation techniques can be utilized. The virtual agent translates the user's query into a language understood by the system, generates a response in that language, and then translates it back into the user's language for delivery.

In some example embodiments, a computer programmable product may be provided. The computer programmable product may comprise at least one non-transitory computer-readable storage medium having stored thereon computer-executable program code instructions that when executed by a computer, cause the computer to execute the method 700.

In an example embodiment, an apparatus for performing the method 700 of FIG. 7 above may comprise a processor (e.g., the processor 202) configured to perform some or each of the operations of the method 700. The processor may, for example, be configured to perform the operations (702-710) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (702-710) may comprise, for example, the processor 202 which may be implemented in the system 200 and/or a device or circuit for executing instructions or executing an algorithm for processing information as described above.

Figure 8:
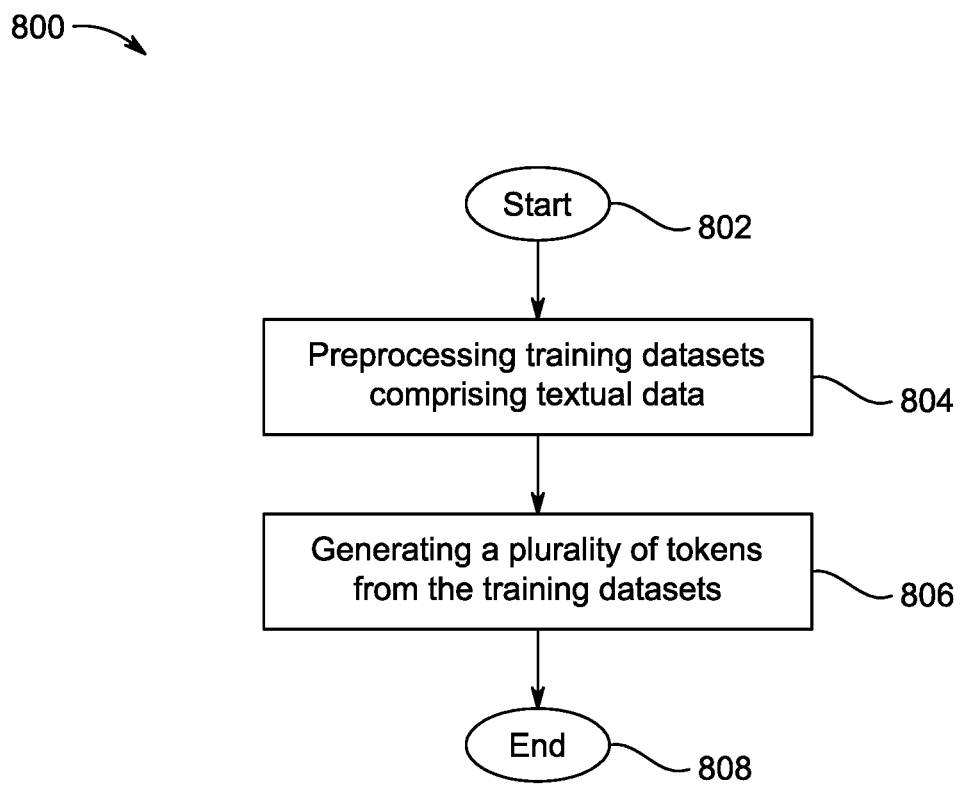
FIG. 8 shows a flow diagram of a method for generating a plurality of token, in accordance with an example embodiment.

FIG. 8 illustrates a method 800 for generating a plurality of token to train an LLM, in accordance with an example embodiment. It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 800 illustrated by the flow diagram of FIG. 8 for generating a plurality of token may start at step 802 and at step 804, the method 800 may include preprocessing training datasets comprising textual data. In this step, the method 800 may preprocess the training datasets that contain textual data. The preprocessing is performed to prepare the data for further analysis and modeling. It typically involves a series of transformations and cleaning operations on the text data. Here are some common operations performed during the preprocessing of textual data:

Text Cleaning: Textual data often contains noise, irrelevant characters, or special symbols that can interfere with analysis. The preprocessing step involves removing unnecessary elements such as punctuation marks, special characters, HTML tags, and numerical values. This ensures that the text data is in a clean and standardized format.

Tokenization: Tokenization is the process of breaking down the text into smaller units, typically words or subwords, known as tokens. This step involves splitting the text into individual tokens to capture the basic semantic units for analysis. Tokenization can be performed using various techniques such as whitespace tokenization, rule-based tokenization, or utilizing specialized libraries or models.

Stop Word Removal: Stop words are common words that do not carry significant meaning and can be safely ignored in text analysis. Examples of stop words include "a," "an," "the," and "is." Removing stop words helps reduce noise and unnecessary information in the dataset.

Lowercasing: Converting all text to lowercase is a common preprocessing step. This normalization ensures that words with different capitalizations are treated as the same word. For example, "apple" and "Apple" would be considered the same word after lowercase conversion.

Lemmatization or Stemming: These techniques reduce words to their base or root forms. Lemmatization converts words to their dictionary form (lemma), while stemming reduces words to their stem by removing suffixes and prefixes. For instance, "running," "ran," and "runs" would all be stemmed to "run".

Handling Missing Data: Textual data may contain missing values or incomplete sentences. Preprocessing can involve imputation techniques to handle missing data, such as replacing missing values with appropriate placeholders or performing data augmentation to generate synthetic data for training purposes.

The method 800, at step 806 may include generating a plurality of tokens from the training datasets and the method 800 further terminates at step 808. The pre-processed text data is split into tokens using the tokenization method. The tokens may be generated based on different strategies, such as breaking text at spaces, punctuation marks, or using more advanced techniques like subword tokenization or character-level tokenization.

Some commonly used tokenization methods are as follows:

Word Tokenization: This method splits text into individual words based on spaces or punctuation marks. It treats each word as a separate token.

Subword Tokenization: The subword tokenization divides words into smaller subword units. This method is often used to handle out-of-vocabulary (OOV) words or to capture morphological variations of words. Examples of subword tokenization methods include Byte-Pair Encoding (BPE) and Unigram Language Model.

Character-Level Tokenization: The character-level tokenization breaks down text into individual characters. It treats each character as a separate token. This method is useful for tasks that require fine-grained analysis at the character level, such as text generation or sentiment analysis.

Sentence Tokenization: The sentence tokenization includes splitting text into individual sentences. It separates the text based on punctuation marks or specific sentence delimiters. This method is commonly used in tasks that require analyzing text at the sentence level, such as machine translation or text summarization.

Custom Tokenization: The custom tokenization includes defining specific rules or patterns to split text into tokens based on domain-specific requirements. This method allows for flexibility in handling specialized cases or unique tokenization needs.

In some example embodiments, a computer programmable product may be provided. The computer programmable product may comprise at least one non-transitory computer-readable storage medium having stored thereon computer-executable program code instructions that when executed by a computer, cause the computer to execute the method 800.

In an example embodiment, an apparatus for performing the method 800 of FIG. 8 above may comprise a processor (e.g., the processor 202) configured to perform some or each of the operations of the method 800. The processor may, for example, be configured to perform the operations (802-808) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (802-808) may comprise, for example, the processor 202 which may be implemented in the system 200 and/or a device or circuit for executing instructions or executing an algorithm for processing information as described above.

Figure 9:
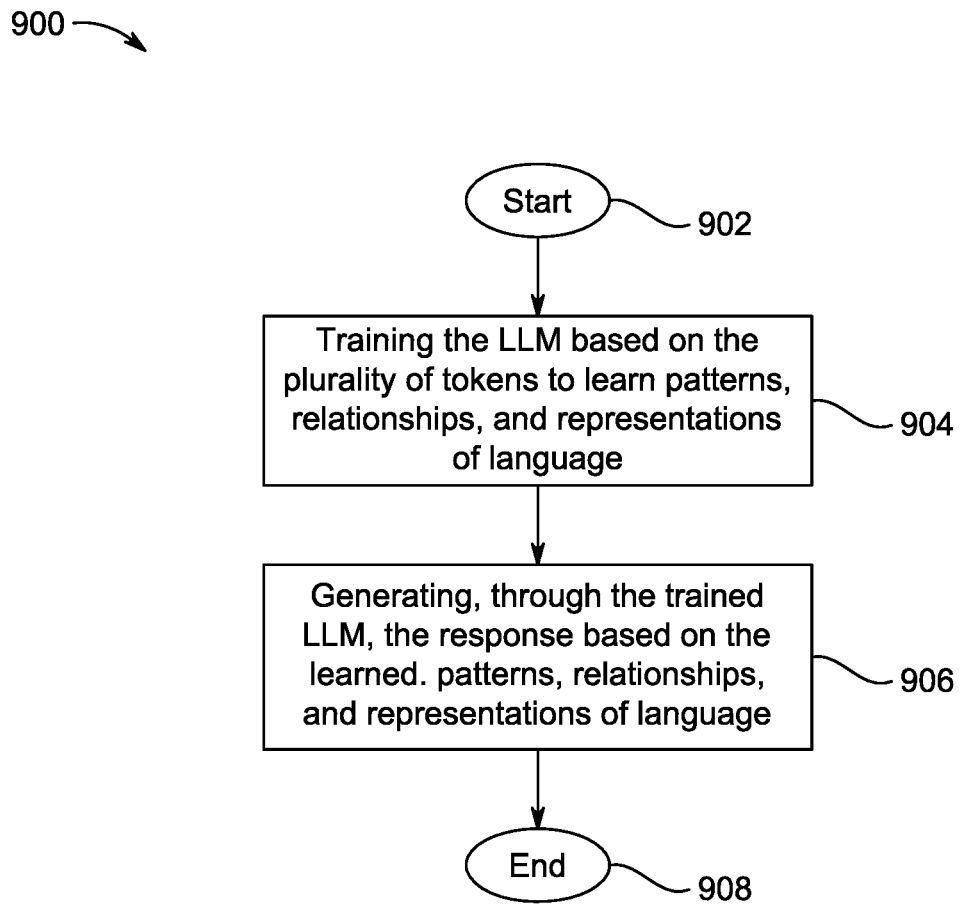
FIG. 9 shows a flow diagram of a method for generating a response based on training an LLM, in accordance with an example embodiment.

FIG. 9 illustrates a method 900 for generating a response based on training an LLM, in accordance with an example embodiment. It will be understood that each block of the flow diagram of the method 900 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 200, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 900 illustrated by the flow diagram of FIG. 9 for generating a response based on training an LLM, may include, at step 904, training the LLM based on the plurality of tokens to learn patterns, relationships, and representations of language. Some common approach for training the LLM is already described in conjunction with FIG. 4.

By preprocessing the training datasets and generating tokens, the method prepares the textual data for further training the LLM. The tokens may act as the building blocks for training the LLM language model, allowing it to learn the language patterns and relationships necessary for generating responses.

The method 900, at step 906 may generate, through the trained LLM, the response based on the learned, patterns, relationships, and representations of language. In a more elaborative way, the response through the trained LLM may be generated by the following approach:

Utilizing Learned Patterns: The trained LLM has learned patterns from the training data, which includes understanding grammar, syntax, and semantic structures. The LLM can identify patterns in the input query or request and utilize this knowledge to generate a response. For example, if the input query is in the form of a question, the LLM can identify question patterns and provide an appropriate response.

Leveraging Relationships: The LLM has learned the relationships between words, phrases, and concepts through its training process. It can understand the associations and connections between different elements in a sentence or document. This knowledge allows the LLM to generate responses that maintain consistency and relevancy to the input query. For instance, if the query mentions specific entities or topics, the LLM can leverage its understanding of relationships to provide accurate and contextually relevant responses.

Representing Language: The LLM has learned to represent language in a meaningful way by capturing the semantic and contextual information in the training data. It can understand the meaning and nuances of different words and phrases and use this understanding to generate coherent and meaningful responses. The LLM can consider the context of the query, including the words used, their order, and the overall context, to generate a response that aligns with the user's intent.

In some example embodiments, a computer programmable product may be provided. The computer programmable product may comprise at least one non-transitory computer-readable storage medium having stored thereon computer-executable program code instructions that when executed by a computer, cause the computer to execute the method 900.

In an example embodiment, an apparatus for performing the method 900 of FIG. 9 above may comprise a processor (e.g., the processor 202) configured to perform some or each of the operations of the method 900. The processor may, for example, be configured to perform the operations (902-908) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (902-908) may comprise, for example, the processor 202 which may be implemented in the system 200 and/or a device or circuit for executing instructions or executing an algorithm for processing information as described above.

As will be appreciated by those skilled in the art, the techniques described in the various embodiments discussed above are not routine, or conventional, or well understood in the art. The present disclosure addresses the limitations of existing techniques in generating human-like responses for virtual agents. By utilizing an LLM and a comprehensive knowledge bank, the tech stack enables the generation of responses that are more relevant, human-like, and empathetic. The incorporation of the LLM-based approach enhances the accuracy and contextuality of the responses. Moreover, the inclusion of empathy in the response generation process enhances the user experience and creates more engaging interactions with the virtual agent.

The techniques discussed above provide advantages like, it automates entirely manual process and reduces considerable manual hours spent by developers on manually generating possible responses for newly identified intents. When trying to come up with responses for new intents that the virtual agent is not able to handle yet, having an automated process provided by the present invention to suggest possible recommendations of responses from multiple documents give an advantage to developers and reduces time taken in virtual agent development. Due to its automated nature, the aforementioned technique may be seamlessly integrated into a larger processing pipeline.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It is to be understood that the above description is intended to be illustrative, and not restrictive. For example, the above-discussed embodiments may be used in combination with each other. Many other embodiments will be apparent to those of skill in the art upon reviewing the above description.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention.

What is claimed is:

1. A computer-implemented method for generating a response through a virtual agent, the computer-implemented method comprising:
receiving information associated with a plurality of themes and topics;
creating a knowledgebase based on the information received;
identifying an intent from a user input using an Artificial Intelligence (AI) model;
analyzing, by the AI model, the knowledgebase based on the intent identified from the user input, wherein analyzing the knowledgebase comprises:
retrieving, via an integrated application programming interface (API), supplemental information from one or more external sources, the external sources comprising at least one of real-time data feeds, supplementary articles, or domain-specific knowledge repositories;
combining the supplemental information retrieved from the external sources with the knowledgebase information;
determining a plurality of responses corresponding to the intent based on the combined information; and providing one or more optimal responses selected from the plurality of responses, as recommendations to the virtual agent; and generating the response corresponding to the intent through the virtual agent based on the recommendations of the one or more optimal responses.

2. The computer-implemented method of claim 1, further comprising:

receiving, by the virtual agent, a query from a user;

determining, by the virtual agent, the intent associated with the query; and generating, by the virtual agent, the response based on the intent for the query.

3. The computer-implemented method of claim 1, wherein the knowledgebase corresponds to a knowledge bank of documents.

4. The computer-implemented method of claim 1, wherein the plurality of themes and topics are modeled in a graph-based structure in the knowledgebase.

5. The computer-implemented method of claim 1, wherein the plurality of topics and themes are extracted from conversation history between at least one of two or more human agents, two or more users, or at least one human agent and at least one user.

6. The computer-implemented method of claim 1, wherein the AI model is a Large Language Model (LLM).

7. The computer-implemented method of claim 6, further comprising:

preprocessing training datasets comprising textual data; and generating a plurality of tokens from the training datasets, wherein the plurality of tokens comprises words and sub-words.

8. The computer-implemented method of claim 7, further comprising training the LLM based on the plurality of tokens to learn patterns, relationships, and representations of language, and wherein the LLM generates the response based on the learned patterns, relationships, and representations of language.

9. The computer-implemented method of claim 1, wherein the intent corresponds to at least one of a new intent or an existing intent, and wherein the new intent is associated with a new query, and the existing intent is associated with a repeated query.

10. A computer system for generating a response through a virtual agent comprising, the computer system comprising: one or more computer processors, one or more computer readable memories, one or more computer readable storage devices, and program instructions stored on the one or more computer readable storage devices for execution by the one or more computer processors via the one or more computer readable memories, the program instructions comprising:

receiving information associated with a plurality of themes and topics;

creating a knowledgebase based on the information received;

identifying an intent from a user input using an Artificial Intelligence (AI) model;

analyzing, by the AI model, the knowledgebase based on the intent identified from the user input, wherein analyzing the knowledgebase comprises:

retrieving, via an integrated application programming interface (API), supplemental information from one or more external sources, the external sources comprising at least one of real-time data feeds, supplementary articles, or domain-specific knowledge repositories;

combining the supplemental information retrieved from the external sources with the knowledgebase information;

determining a plurality of responses corresponding to the intent based on the combined information; and providing one or more optimal responses selected from the plurality of responses, as recommendations to the virtual agent; and generating the response corresponding to the intent through the virtual agent based on the recommendations of the one or more optimal responses.

11. The computer system of claim 10, further comprising:

receiving, by the virtual agent, a query from a user;

determining, by the virtual agent, the intent associated with the query; and generating, by the virtual agent, the response based on the intent for the query.

12. The computer system of claim 10, wherein the knowledgebase corresponds to a knowledge bank of documents.

13. The computer system of claim 10, wherein the plurality of themes and topics are modeled in a graph-based structure in the knowledgebase.

14. The computer system of claim 10, wherein the plurality of topics and themes are extracted from conversation history between at least one of two or more human agents, two or more users, or at least one human agent and at least one user.

15. The computer system of claim 10, wherein the AI model is a Large Language Model (LLM).

16. The computer system of claim 15, further comprising:

preprocessing training datasets comprising textual data; and generating a plurality of tokens from the training datasets, wherein the plurality of tokens comprises words and sub-words.

17. The computer system of claim 16, further comprising training the LLM based on the plurality of tokens to learn patterns, relationships, and representations of language, and wherein the LLM generates the response based on the learned patterns, relationships, and representations of language.

18. The computer system of claim 10, wherein the intent corresponds to at least one of a new intent or an existing intent, and wherein the new intent is associated with a new query, and the existing intent is associated with a repeated query.

19. A non-transitory computer-readable storage medium having stored thereon computer executable instructions which, when executed by one or more processors, cause the one or more processors to carry out operations for generating a response through a virtual agent, the operations comprising:

receiving information associated with a plurality of themes and topics;

creating a knowledgebase based on the information received;

identifying an intent from a user input using an Artificial Intelligence (AI) model;

analyzing, by the AI model, the knowledgebase based on the intent identified from the user input, wherein analyzing the knowledgebase comprises:

retrieving, via an integrated application programming interface (API), supplemental information from one or more external sources, the external sources comprising at least one of real-time data feeds, supplementary articles, or domain-specific knowledge repositories;

combining the supplemental information retrieved from the external sources with the knowledgebase information;
determining a plurality of responses corresponding to the intent based on the combined information; and
providing one or more optimal responses selected from the plurality of responses, as recommendations to the virtual agent; and
generating the response corresponding to the intent through the virtual agent based on the recommendations of the one or more optimal responses.

* * * * *